United States Patent
Hu et al.

(10) Patent No.: US 11,445,268 B2
(45) Date of Patent: Sep. 13, 2022

(54) METHOD FOR RETRANSMITTING PACKET ON WIRELESS FIDELITY LINK AND APPARATUS

(71) Applicant: Huawei Technologies Co., Ltd., Shenzhen (CN)

(72) Inventors: Luyao Hu, Wuhan (CN); Ziling Li, Wuhan (CN); Xijin Tan, Shenzhen (CN); Yiming Wang, Dongguan (CN); Yong Luo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 17/005,859

(22) Filed: Aug. 28, 2020

(65) Prior Publication Data

US 2020/0396520 A1 Dec. 17, 2020

Related U.S. Application Data

(63) Continuation of application No. PCT/CN2019/078730, filed on Mar. 19, 2019.

(30) Foreign Application Priority Data

Mar. 21, 2018 (CN) .......................... 201810234929.9

(51) Int. Cl.
*H04N 21/6375* (2011.01)
*H04L 1/18* (2006.01)
*H04N 21/61* (2011.01)
*H04N 21/647* (2011.01)

(52) U.S. Cl.
CPC ....... *H04N 21/6375* (2013.01); *H04L 1/1816* (2013.01); *H04N 21/6131* (2013.01); *H04N 21/64738* (2013.01)

(58) Field of Classification Search
CPC ...................................................... H04W 88/06
See application file for complete search history.

(56) References Cited

U.S. PATENT DOCUMENTS

| 2005/0207345 A1 | 9/2005 | Onggosanusi et al. |
| 2011/0051599 A1 | 3/2011 | Tanigawa et al. |
| 2011/0261735 A1 | 10/2011 | Cordeiro |

(Continued)

FOREIGN PATENT DOCUMENTS

| CN | 102098301 A | 6/2011 |
| CN | 103119980 A | 5/2013 |

(Continued)

*Primary Examiner* — Clifford Hilaire
(74) *Attorney, Agent, or Firm* — Conley Rose, P.C.

(57) ABSTRACT

A method for retransmitting a packet on a wireless fidelity link includes receiving a packet retransmission request sent by a user terminal and determining a packet that needs to be retransmitted, detecting a downlink quality indicator on a gateway side of a first wireless fidelity link and a downlink quality indicator on a gateway side of a second wireless fidelity link, determining a link for retransmitting the packet, based on the downlink quality indicator on the gateway side of the first wireless fidelity link and the downlink quality indicator on the gateway side of the second wireless fidelity link, and sending, to the user terminal on the determined link for retransmitting the packet, the determined packet that needs to be retransmitted.

25 Claims, 2 Drawing Sheets

(56) References Cited

U.S. PATENT DOCUMENTS

| | | | |
|---|---|---|---|
| 2013/0142059 A1* | 6/2013 | Di Girolamo | H04W 88/16 370/252 |
| 2015/0003336 A1* | 1/2015 | Singh | H04W 72/02 370/329 |
| 2015/0103663 A1 | 4/2015 | Amini et al. | |
| 2015/0201410 A1 | 7/2015 | Tang et al. | |
| 2016/0192381 A1 | 6/2016 | Gao et al. | |
| 2016/0278072 A1* | 9/2016 | Palle | H04W 72/085 |

FOREIGN PATENT DOCUMENTS

| | | |
|---|---|---|
| CN | 103596228 A | 2/2014 |
| CN | 104469958 A | 3/2015 |
| CN | 104579610 A | 4/2015 |
| CN | 104660573 A | 5/2015 |
| CN | 105681326 A | 6/2016 |
| CN | 105682150 A | 6/2016 |
| KR | 20130109420 A | 10/2013 |
| WO | 2009109076 A1 | 9/2009 |
| WO | 2016003862 A1 | 1/2016 |

* cited by examiner

METHOD FOR RETRANSMITTING PACKET ON WIRELESS FIDELITY LINK AND APPARATUS

CROSS-REFERENCE TO RELATED APPLICATIONS

This application is a continuation of International Patent Application No. PCT/CN2019/078730, filed on Mar. 19, 2019, which claims priority to Chinese Patent Application No. 201810234929.9, filed on Mar. 21, 2018. The disclosures of the aforementioned applications are hereby incorporated by reference in their entireties.

TECHNICAL FIELD

The present disclosure relates to the communications field, and in particular, to a method for retransmitting a packet on a Wi-Fi link and an apparatus.

BACKGROUND

Due to cabling restrictions, Wi-Fi links are often used as data channels for carrying video streams when video services, such as Internet Protocol (IP) television (IPTV) and over-the-top (OTT) video services, are deployed in hotels and homes. Currently, operating frequency bands of a Wi-Fi link include 2.4 Gigahertz (GHz) and 5 GHz. The 2.4 GHz operating frequency band features low signal attenuation and large coverage. The 5 GHz operating frequency band features high bandwidth, many selectable channels, less contention, and low interference. A video service requires high bandwidth and is sensitive to latency and packet loss. Therefore, a 5 GHz Wi-Fi link is usually used for carrying the video service for a mid- and high-end product.

A Wi-Fi link uses an air interface for transmission and is unstable. Inevitably, even a 5 GHz link with high bandwidth is sometimes incapable of carrying a video due to insufficient quality of the link. For example, distant deployment results in insufficient signal strength, another device that operates on a 5 GHz frequency band generates interference, receiving of a radar signal triggers an avoidance mechanism and leads to switching of an operating channel, and a negotiated rate selection algorithm causes rate fluctuation. In this case, a packet loss on a Wi-Fi air interface, queue congestion, and a latency increase may occur. As a result, artifacts or even frame freezing of video services may be further caused.

SUMMARY

Embodiments of the present disclosure provide a method for retransmitting a packet on a Wi-Fi link and an apparatus, to ensure a response speed and a success rate of video packet retransmission and reduce artifacts and frame freezing of a video service.

According to a first aspect, a method for retransmitting a packet on a Wi-Fi link is provided, includes a gateway first receives a packet retransmission request sent by a user terminal and determines a packet that needs to be retransmitted, the gateway detects a downlink quality indicator on a gateway side of a first Wi-Fi link and a downlink quality indicator on a gateway side of a second Wi-Fi link, and determines a link for retransmitting the packet, based on the downlink quality indicator on the gateway side of the first Wi-Fi link and the downlink quality indicator on the gateway side of the second Wi-Fi link, and the gateway sends, to the user terminal on the determined link for retransmitting the packet, the determined packet that needs to be retransmitted, where an operating frequency band of the first Wi-Fi link is different from an operating frequency band of the second Wi-Fi link.

In some implementations of the first aspect, the method further includes receiving a downlink quality indicator that is sent by the user terminal and that is on a user terminal side of the first Wi-Fi link and a downlink quality indicator that is sent by the user terminal and that is on a user terminal side of the second Wi-Fi link, and determining the link for sending the to-be-retransmitted packet, based on the downlink quality indicator on the gateway side of the first Wi-Fi link, the downlink quality indicator on the gateway side of the second Wi-Fi link, an uplink quality indicator on the user terminal side of the first Wi-Fi link, and an uplink quality indicator on the user terminal side of the second Wi-Fi link.

In some implementations of the first aspect, the operating frequency band of the first Wi-Fi link is 5 GHz and the operating frequency band of the second Wi-Fi link is 2.4 GHz.

In some implementations of the first aspect, the method further includes the gateway receiving a video stream pushed by a video source server, and sends the video stream to the user terminal on the first Wi-Fi link.

In some implementations of the first aspect, the downlink quality indicator and the uplink quality indicator each include a congestion level and an estimated latency, and if a congestion level of a downlink on the gateway side of the first Wi-Fi link is greater than or equal to a first threshold, it is determined to send the to-be-retransmitted packet on the second Wi-Fi link, if a congestion level of a downlink on the gateway side of the first Wi-Fi link is less than or equal to a second threshold, it is determined to send the to-be-retransmitted packet on the first Wi-Fi link, or if a congestion level of a downlink on the gateway side of the first Wi-Fi link is greater than a second threshold but less than a first threshold, either link whose estimated latency is lower is selected from the first Wi-Fi link and the second Wi-Fi link, to send the to-be-retransmitted packet.

In some implementations of the first aspect, the first threshold is 0.9 and the second threshold is 0.1.

In some implementations of the first aspect, the congestion level is equal to a percentage of a quantity of to-be-sent packets in a total queue size, and the estimated latency satisfies the following equation.

$$\text{Estimated latency} = \frac{\text{Quantity of to-be-sent packets} \times \text{Average packet size}}{\text{Transmission quality}},$$

and the transmission quality satisfies the following equation.

Transmission quality=Negotiated rate×(1−Interference duty cycle)×Packet sending success rate.

In some implementations of the first aspect, that the determined packet that needs to be retransmitted is sent to the user terminal includes retransmitting a frame I in the packet based on a preset quantity of retransmissions of the frame I and a frame P in the packet based on a preset quantity of retransmissions of the frame P, where the quantity of retransmissions of the frame I is N, the quantity of retransmissions of the frame P is M, a relationship between N and M is N>M, and N and M are non-zero natural numbers.

In some implementations of the first aspect, the method further includes retransmitting a frame B in the packet based on a preset quantity of retransmissions of the frame B, where the quantity of retransmissions of the frame B is K, a relationship between the quantity K of retransmissions of the frame B and the quantity M of retransmissions of the frame P is M>K, and K is a non-zero natural number.

According to a second aspect, an embodiment of the present disclosure provides a gateway, connected to a user terminal through a first Wi-Fi link and a second Wi-Fi link, where an operating frequency band of the first Wi-Fi link is different from an operating frequency band of the second Wi-Fi link, and the gateway includes a first receiving unit configured to receive a packet retransmission request sent by the user terminal and determine a packet that needs to be retransmitted, a first detection unit configured to detect a downlink quality indicator on a gateway side of a first Wi-Fi link and a downlink quality indicator on a gateway side of a second Wi-Fi link, and determine a link for retransmitting the packet, based on the downlink quality indicator on the gateway side of the first Wi-Fi link and the downlink quality indicator on the gateway side of the second Wi-Fi link, and a first sending unit configured to send, to the user terminal on the determined link for retransmitting the packet, the determined packet that needs to be retransmitted, where the operating frequency band of the first Wi-Fi link is different from the operating frequency band of the second Wi-Fi link.

In some implementations of the second aspect, the first receiving unit is further configured to receive an uplink quality indicator that is sent by the user terminal and that is on a user terminal side of the first Wi-Fi link and an uplink quality indicator that is sent by the user terminal and that is on a user terminal side of the second Wi-Fi link, and the first detection unit is further configured to determine the link for sending the to-be-retransmitted packet, based on the downlink quality indicator on the gateway side of the first Wi-Fi link, the downlink quality indicator on the gateway side of the second Wi-Fi link, the uplink quality indicator on the user terminal side of the first Wi-Fi link, and the uplink quality indicator on the user terminal side of the second Wi-Fi link.

In some implementations of the second aspect, the first receiving unit is further configured to receive a video stream pushed by a video source server, and send the video stream to the user terminal on the first Wi-Fi link.

In some implementations of the second aspect, the operating frequency band of the first Wi-Fi link is 5 GHz and the operating frequency band of the second Wi-Fi link is 2.4 GHz.

In some implementations of the second aspect, the downlink quality indicator and the uplink quality indicator each include a congestion level and an estimated latency, and the first detection unit is further configured to, if a congestion level of a downlink on the gateway side of the first Wi-Fi link is greater than or equal to a first threshold, determine to send the to-be-retransmitted packet on the second Wi-Fi link, if a congestion level of a downlink on the gateway side of the first Wi-Fi link is less than or equal to a second threshold, determine to send the to-be-retransmitted packet on the first Wi-Fi link, or if a congestion level of a downlink on the gateway side of the first Wi-Fi link is greater than a second threshold but less than a first threshold, select, from the first Wi-Fi link and the second Wi-Fi link, either link whose estimated latency is lower, to send the to-be-retransmitted packet.

In some implementations of the second aspect, the first threshold is 0.9 and the second threshold is 0.1.

In some implementations of the second aspect, the first detection unit is equal to the congestion level is equal to a percentage of a quantity of to-be-sent packets in a total queue size, and the estimated latency satisfies the following equation.

$$\text{Estimated latency} = \frac{\text{Quantity of to-be-sent packets} \times \text{Average packet size}}{\text{Transmission quality}}.$$

And the transmission quality satisfies the following equation.

Transmission quality=Negotiated rate×(1−Interference duty cycle)×Packet sending success rate.

In some implementations of the second aspect, that the first sending unit sends, to the user terminal, the determined packet that needs to be retransmitted includes retransmitting a frame I in the packet based on a preset quantity of retransmissions of the frame I and a frame P in the packet based on a preset quantity of retransmissions of the frame P, where the quantity of retransmissions of the frame I is N, the quantity of retransmissions of the frame P is M, a relationship between N and M is N>M, and N and M are non-zero natural numbers.

In some implementations of the second aspect, that the first sending unit sends, to the user terminal, the determined packet that needs to be retransmitted further includes retransmitting a frame B in the packet based on a preset quantity of retransmissions of the frame B, where the quantity of retransmissions of the frame B is K, a relationship between the quantity K of retransmissions of the frame B and the quantity M of retransmissions of the frame P is M>K, and K is a non-zero natural number.

According to a third aspect, a gateway is provided, including a memory, a processor, and a program that is stored in the memory and that can be run on the processor, where when executing the program, the processor performs the method according to any embodiment of the first aspect.

According to a fourth aspect, a computer-readable storage medium is provided, where the computer-readable storage medium includes an instruction, and when the instruction is run on a gateway, the gateway is enabled to perform the method according to any embodiment of the first aspect.

According to a fifth aspect, a computer program product including an instruction is provided, where when the instruction is run on a gateway, the gateway is enabled to perform the method according to any embodiment of the first aspect.

BRIEF DESCRIPTION OF DRAWINGS

To describe the technical solutions in the implementations of the present disclosure more clearly, the following briefly describes the accompanying drawings required for describing the implementations.

DESCRIPTION OF EMBODIMENTS

To make the objectives, technical solutions, and benefits of the embodiments of the present disclosure clearer and more comprehensible, the following further describes the present disclosure in detail with reference to the accompanying drawings and embodiments. It should be understood that specific embodiments described herein are merely used to explain the present disclosure, but are not intended to limit the present disclosure.

Figure 1:
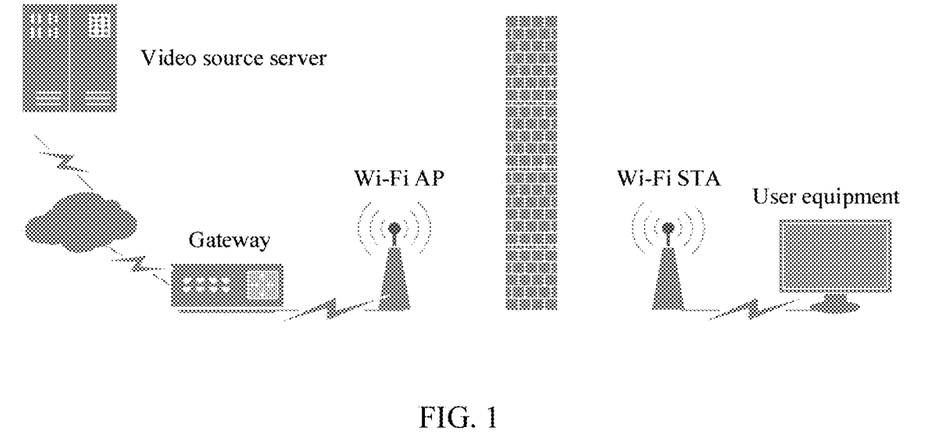
FIG. 1 is a schematic diagram of a scenario to which an embodiment of the present disclosure applies and in which a video service is carried on a Wi-Fi link.

FIG. 1 is a schematic diagram of an example application scenario of an embodiment of the present disclosure. A system in this scenario includes a video source server, a gateway, and a user terminal. The video source server pushes a video stream to the gateway, the gateway forwards the video stream to the user terminal, and a video application on the user terminal plays a video. During video playing on the user terminal, the user terminal buffers a small amount of video content in advance. If a video frame cannot be decoded due to a video packet loss detected in the buffered video, a lost packet needs to be obtained within a relatively short buffer period (which is usually 1 second (s)). If the lost packet is not obtained within the relatively short buffer period, the frame is lost, and frame freezing is caused. To obtain the lost packet, the video application on the user terminal sends, to the video server, a request for retransmitting the packet. After receiving the request that is for retransmitting the packet and that is sent by the user terminal, the gateway searches a buffered video of the gateway for the video packet that needs to be retransmitted. After receiving the request that is for retransmitting the packet and that is sent by the user terminal, the gateway searches the buffered video of the gateway for the video packet that needs to be retransmitted, and then retransmits, to the user terminal, the packet that needs to be retransmitted. After receiving the retransmitted packet, the user terminal reassembles the video frame to obtain a normal packet.

In this embodiment of the present disclosure, two Wi-Fi links with different operating frequency bands are established between the gateway and a user terminal side. For example, an operating frequency band of one link is 2.4 GHz, and an operating frequency band of the other link is 5 GHz. The gateway establishes a Wi-Fi access point (AP). The user terminal (for example, a user equipment in FIG. 1) is connected to the AP through a Wi-Fi station, and then is connected to the gateway. When the links work properly, the 5 GHz Wi-Fi link is used as a main data channel for carrying a heavy traffic flow, for example, a video stream sent by the gateway to the user terminal. The 2.4 GHz Wi-Fi link is used as a fast dedicated channel for a few high-priority packets, for example, a video packet to be retransmitted by the user terminal to the gateway.

After receiving the request that is for retransmitting the packet and that is sent by the user terminal, the gateway detects a downlink quality indicator on a gateway side of a first Wi-Fi link and a downlink quality indicator on a gateway side of a second Wi-Fi link, and determines a path for sending the to-be-retransmitted packet, based on the downlink quality indicator on the gateway side of the first Wi-Fi link and the downlink quality indicator on the gateway side of the second Wi-Fi link. When there is transmission quality variation on one link, retransmission is performed on the other link. In other words, when quality of the 5 GHz Wi-Fi link is poor, the video packet that needs to be retransmitted may be sent to the user terminal on the 2.4 GHz Wi-Fi link. The technical solution improves a retransmission response speed and a success rate, and reduces packet losses and artifacts and frame freezing of a video service.

Figure 2:
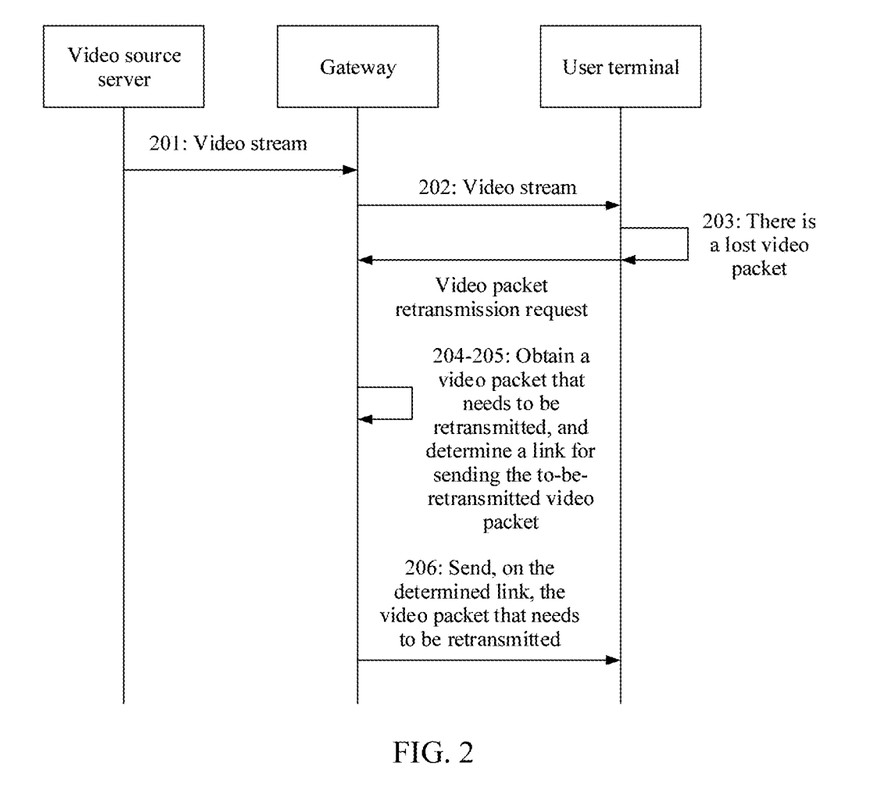
FIG. 2 shows a method procedure for retransmitting a packet on a Wi-Fi link according to an embodiment of the present disclosure.

Based on the foregoing description, FIG. 2 shows an example method procedure for retransmitting a packet on a Wi-Fi link according to an embodiment of the present disclosure. The method procedure is performed by a gateway.

As shown in FIG. 2, the method procedure further includes the following steps.

Step 201. The gateway receives a video stream pushed by a video source server.

Step 202. The gateway sends the video stream to a user terminal.

The gateway receives the video stream pushed by the video source server and sends the video stream to the user terminal on a first Wi-Fi link. The video stream may be of an IPTV or OTT type, or a live television (TV) or a video on demand. The video stream is data constituted by consecutive video packets.

Step 203. The user terminal detects that there is a lost video packet, and sends a packet retransmission request message to the gateway.

The packet retransmission request message sent by the user terminal carries an identifier of the lost packet.

Step 204. The gateway receives the packet retransmission request message sent by the user terminal and determines a packet that needs to be retransmitted.

Based on the identifier that is of the packet that needs to be retransmitted and that is carried in the packet retransmission request message, the gateway may search video packets locally buffered in the gateway for the video packet that needs to be retransmitted.

Step 205. The gateway detects a downlink quality indicator on a gateway side of the first Wi-Fi link and a downlink quality indicator on a gateway side of a second Wi-Fi link, and determines a path for sending the to-be-retransmitted packet, based on the downlink quality indicator on the gateway side of the first Wi-Fi link and the downlink quality indicator on the gateway side of the second Wi-Fi link.

Actually, the gateway is far away from the user terminal. For example, an interference source is 10 meters away from the user terminal and strongly interferes with the user terminal. However, the interference source is 30 meters away from the gateway, and the gateway is basically not interfered with by the interference source. In view of this, when detecting that downlink quality on the gateway side of the second Wi-Fi link is better than downlink quality on the gateway side of the first Wi-Fi link, the gateway determines to send the to-be-retransmitted packet on the second Wi-Fi link. Actually, uplink quality on a user terminal side of the second Wi-Fi link is relatively poor, and therefore cannot be used for receiving the packet retransmitted by the gateway. To more accurately determine a link quality indicator, the gateway may further consider an uplink quality indicator on a user terminal side of the first Wi-Fi link and the uplink quality indicator on a user terminal side of the second Wi-Fi link. The gateway obtains the uplink quality indicator that is fed back by the user terminal and that is on the user terminal side of the first Wi-Fi link and the uplink quality indicator that is fed back by the user terminal and that is on the user terminal side of the second Wi-Fi link, and determines the link for sending the to-be-retransmitted packet, based on the downlink quality indicator on the gateway side of the first Wi-Fi link, the downlink quality indicator on the gateway side of the second Wi-Fi link, the uplink quality indicator on the user terminal side of the first Wi-Fi link, and the uplink quality indicator on the user terminal side of the second Wi-Fi link. In this embodiment of the present disclosure, a downlink indicates a direction from the gateway to the user terminal, and an uplink indicates a direction from the user terminal to the gateway.

Step 206. The gateway sends, to the user terminal on the determined path for retransmitting the packet, the determined packet that needs to be retransmitted.

In this embodiment of the present disclosure, an operating frequency band of the first Wi-Fi link is different from an operating frequency band of the second Wi-Fi link. For example, the operating frequency band of the first Wi-Fi link is set to 5 GHz, and the operating frequency band of the second Wi-Fi link is set to 2.4 GHz. Usually, the first Wi-Fi link is used to carry the video stream that is sent by the gateway to the user terminal. The second Wi-Fi link is used to carry the packet retransmission request that is sent by the user terminal to the gateway and carry, when quality of the first Wi-Fi link is poor, a to-be-retransmitted video packet that is sent by the gateway to the user terminal.

Specifically, in this embodiment of the present disclosure, the downlink quality indicator and the uplink quality indicator each include a congestion level and an estimated latency. Congestion refers to a case in which network transmission performance deteriorates due to limited resources of forwarding nodes when there are a large quantity of transmitted packets. If a congestion level of a downlink on the gateway side of the first Wi-Fi link is greater than or equal to a first threshold (which, for example, is set to 0.9), it is determined to send the to-be-retransmitted packet on the second Wi-Fi link. If a congestion level of a downlink on the gateway side of the first Wi-Fi link is less than or equal to a second threshold (which, for example, is set to 0.1), it is determined to send the to-be-retransmitted packet on the first Wi-Fi link. If a congestion level of a downlink on the gateway side of the first Wi-Fi link is greater than a second threshold but less than a first threshold, either link whose estimated latency is lower is selected from the first Wi-Fi link and the second Wi-Fi link, to send the to-be-retransmitted packet.

Specifically, the congestion level is equal to a percentage of a quantity of to-be-sent packets in a total queue size.

A calculation formula of the estimated latency is satisfied by the following equation.

$$\text{Estimated latency} = \frac{\text{Quantity of to-be-sent packets} \times \text{Average packet size}}{\text{Transmission quality}} \quad (1)$$

A calculation formula of the transmission quality is satisfied by the following equation.

$$\text{Transmission quality} = \text{Negotiated rate} \times (1-\text{Interference duty cycle}) \times \text{Packet sending success rate} \quad (2)$$

In the foregoing formulas (1) and (2), the total queue size refers to a maximum quantity of packets that can be buffered for a sending packet queue. The quantity of to-be-sent packets refers to a total quantity of packets that need to be retransmitted. The negotiated rate refers to a modulation and coding scheme for a Wi-Fi radio frequency, and different modulation schemes correspond to different rates and robustness. The interference duty cycle indicates a percentage of time when there is an interfering signal in total time. The packet sending success rate refers to a percentage of successfully sent packets in total sent packets. A Wi-Fi packet can be successfully sent only after an acknowledgment frame is received from a receiver. If the acknowledgment frame is not received from the receiver, the Wi-Fi packet fails to be sent.

The foregoing calculation methods for the congestion level, the estimated latency, and the transmission quality are merely examples. There may be other calculation manners, and examples are not enumerated herein.

Specifically, that the gateway sends, to the user terminal, the determined packet that needs to be retransmitted includes retransmitting a frame I in the packet based on a preset quantity of retransmissions of the frame I and a frame P in the packet based on a preset quantity of retransmissions of the frame P. The quantity of retransmissions of the frame I is N, the quantity of retransmissions of the frame P is M, a relationship between N and M is N>M, and N and M are non-zero natural numbers. On the basis that the frame I and the frame P are retransmitted, the gateway may further retransmit a frame B in the packet based on a preset quantity of retransmissions of the frame B. The quantity of retransmissions of the frame B is K, a relationship between the quantity K of retransmissions of the frame B and the quantity M of retransmissions of the frame P is M>K, and K is a non-zero natural number.

Figure 3:
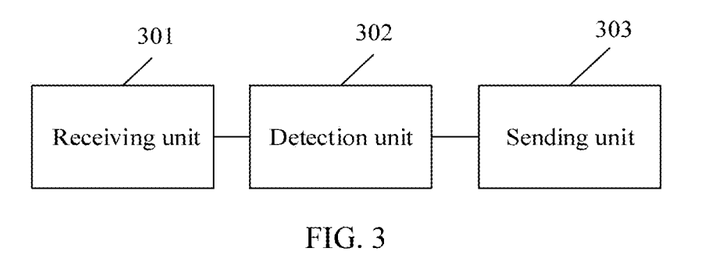
FIG. 3 is a schematic diagram of a gateway according to an embodiment of the present disclosure.

Based on a same concept, FIG. 3 shows an example of a gateway provided in an embodiment of the present disclosure. The gateway is connected to a user terminal through a first Wi-Fi link and a second Wi-Fi link. A video source server pushes a video stream to the gateway, the gateway forwards the video stream to the user terminal, and a video application on the user terminal plays a video. The gateway in this embodiment includes a receiving unit 301, a detection unit 302, and a sending unit 303.

The receiving unit 301 is configured to receive a packet retransmission request sent by the user terminal and determine a packet that needs to be retransmitted.

The detection unit 302 is configured to detect a downlink quality indicator on a gateway side of the first Wi-Fi link and a downlink quality indicator on a gateway side of a second Wi-Fi link, and determine a path for retransmitting the packet, based on the downlink quality indicator on the gateway side of the first Wi-Fi link and the downlink quality indicator on the gateway side of the second Wi-Fi link.

The sending unit 303 is configured to send, to the user terminal on the determined path for retransmitting the packet, the determined packet that needs to be retransmitted.

In this embodiment of the present disclosure, an operating frequency band of the first Wi-Fi link is different from an operating frequency band of the second Wi-Fi link. The operating frequency band of the first Wi-Fi link is 5 GHz, and the operating frequency band of the second Wi-Fi link is 2.4 GHz. Usually, the first Wi-Fi link is used to carry the video stream that is sent by the gateway to the user terminal. The second Wi-Fi link is used to carry the packet retransmission request that is sent by the user terminal to the gateway and carry, when quality of the first Wi-Fi link is poor, a retransmitted video packet that is sent by the gateway to the user terminal.

To improve accuracy, when determining a sending path for retransmitting the packet, the gateway may further consider an uplink quality indicator on a user terminal side of the first Wi-Fi link and an uplink quality indicator on a user terminal side of the second Wi-Fi link. The receiving unit 301 is further configured to receive the uplink quality indicator that is sent by the user terminal and that is on the user terminal side of the first Wi-Fi link and the uplink quality indicator that is sent by the user terminal and that is on the user terminal side of the second Wi-Fi link.

The detecting unit 302 is configured to select, as the link for sending the to-be-retransmitted packet, either link with better quality from the first Wi-Fi link and the second Wi-Fi link based on the downlink quality indicator on the gateway side of the first Wi-Fi link, the downlink quality indicator on the gateway side of the second Wi-Fi link, the uplink quality indicator on the user terminal side of the first Wi-Fi link, and the uplink quality indicator on the user terminal side of the second Wi-Fi link, and respond to retransmitting the packet as soon as possible.

For the detection unit of the gateway, the downlink quality indicator and the uplink quality indicator each include a congestion level and an estimated latency. The congestion level refers to a case in which network transmission performance deteriorates due to limited resources of forwarding nodes when a quantity of transmitted packets is excessively large. If a congestion level of a downlink on the gateway side of the first Wi-Fi link is greater than or equal to a first threshold (which, for example, is set to 0.9), it is determined to send the to-be-retransmitted packet on the second Wi-Fi link. If a congestion level of a downlink on the gateway side of the first Wi-Fi link is less than or equal to a second threshold (which, for example, is set to 0.1), it is determined to send the to-be-retransmitted packet on the first Wi-Fi link. If a congestion level of a downlink on the gateway side of the first Wi-Fi link is greater than a second threshold but less than a first threshold, either link whose estimated latency is lower is selected from the first Wi-Fi link and the second Wi-Fi link, to send the to-be-retransmitted packet.

For specific descriptions of the congestion level and the estimated latency, refer to the descriptions in the method shown in FIG. 2. Details are not described herein again.

Figure 4:
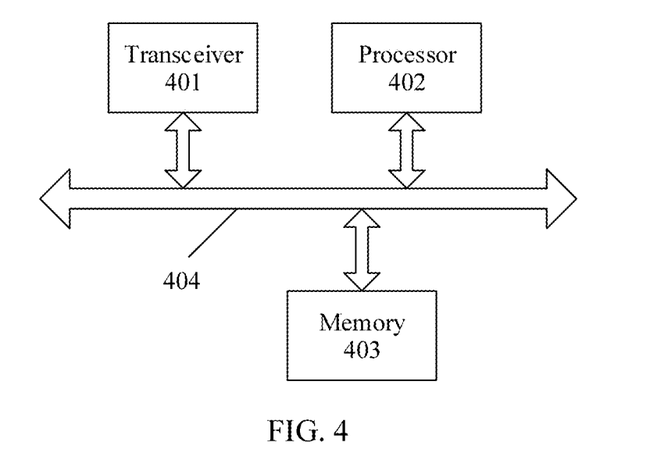
FIG. 4 is a schematic diagram of another gateway according to an embodiment of the present disclosure.

Based on a same concept, FIG. 4 shows a gateway 400 provided in an embodiment of the present disclosure. The gateway includes a transceiver 401, a processor 402, and a memory 403. The processor 402 is configured to control an operation of the device 400. The memory 403 may include a read-only memory and a random access memory, and store an instruction and data that may be executed by the processor 402. A part of the memory 403 may further include a nonvolatile random access memory (NVRAM). Components such as the transceiver 401, the processor 402, and the memory 403 are connected by a bus 404. In addition to a data bus, the bus 404 may further include a power bus, a control bus, and a status signal bus. However, for clear description, various types of buses in the figure are marked as the bus 404.

The method that is for retransmitting a packet and that is disclosed in FIG. 2 in the embodiments of the present disclosure may be applied to the processor 402, or may be implemented by the processor 402. In an implementation process, steps of a processing procedure may be implemented using an integrated logical circuit of hardware in the processor 402 or an instruction in a form of software. The processor 402 may be a general purpose processor, a digital signal processor, an application-specific integrated circuit, a field programmable gate array or another programmable logic device, a discrete gate or transistor logic device, or a discrete hardware component, and may implement or execute the method, steps, and logical block diagrams shown in FIG. 2 in the embodiments of the present disclosure. The general purpose processor may be a microprocessor or any conventional processor or the like. The steps of the method disclosed with reference to FIG. 2 in the embodiments of the present disclosure may be directly performed by a hardware processor, or may be performed using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 403, and the processor 402 reads information stored in the memory 403 and completes the steps in the method shown in FIG. 2 in combination with hardware of the processor 402.

The transceiver 401 receives a packet retransmission request sent by a user terminal and determines a packet that needs to be retransmitted. The processor 402 detects a downlink quality indicator on a gateway side of the first Wi-Fi link and a downlink quality indicator on a gateway side of a second Wi-Fi link, and determines a path for retransmitting the packet, based on the downlink quality indicator on the gateway side of the first Wi-Fi link and the downlink quality indicator on the gateway side of the second Wi-Fi link. The transceiver 401 sends, to the user terminal on the determined link for retransmitting the packet, the determined packet that needs to be retransmitted.

In an embodiment, the transceiver 401 is further configured to receive an uplink quality indicator that is sent by the user terminal and that is on a user terminal side of the first Wi-Fi link and an uplink quality indicator that is sent by the user terminal and that is on a user terminal side of the second Wi-Fi link.

The processor 402 further determines a link for retransmitting the packet based on the downlink quality indicator on the gateway side of the first Wi-Fi link, the downlink quality indicator on the gateway side of the second Wi-Fi link, the uplink quality indicator on the user terminal side of the first Wi-Fi link, and the uplink quality indicator on the user terminal side of the second Wi-Fi link.

For the processor 402, a quality indicator of each of the first Wi-Fi link and the second Wi-Fi link includes a congestion level and an estimated latency. Specifically, if a congestion level of a downlink on the gateway side of the first Wi-Fi link is greater than or equal to a first threshold (which, for example, is set to 0.9), it is determined to send the to-be-retransmitted packet on the second Wi-Fi link. If a congestion level of a downlink on the gateway side of the first Wi-Fi link is less than or equal to a second threshold (which, for example, is set to 0.1), it is determined to send the to-be-retransmitted packet on the first Wi-Fi link. If a congestion level of a downlink on the gateway side of the first Wi-Fi link is greater than a second threshold but less than a first threshold, either link whose estimated latency is lower is selected from the first Wi-Fi link and the second Wi-Fi link, to send the to-be-retransmitted packet.

For specific descriptions of the congestion level and the estimated latency, refer to the descriptions in the method shown in FIG. 2. Details are not described herein again.

An embodiment of the present disclosure further provides a computer storage medium. The computer storage medium is configured to store computer software instructions used by the gateway shown in FIG. 2, and includes a program related to executing the foregoing method embodiment. The program is executed, and a retransmission response speed and a success rate are ensured. This reduces packet losses and artifacts and frame freezing of a video service.

An embodiment of this application provides a computer program product including an instruction. When the computer program product runs on a computer, the computer is enabled to execute an instruction for the method that is for retransmitting a packet and that is shown in FIG. 2. This ensures a retransmission response speed and a success rate, and reduces packet losses and artifacts and frame freezing of a video service.

A person skilled in the art should understand that the embodiments of the present disclosure may be provided as a method, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc-read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine such that the instructions executed by the computer or the processor of the other programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, a person skilled in the art can make changes and modifications to these embodiments once they learn the basic concepts. Therefore, the following claims are intended to be construed as to cover the preferred embodiments and all changes and modifications falling within the scope of the present disclosure.

It is clear that a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies of the present disclosure.

What is claimed is:

1. A method implemented by a gateway and comprising:
   receiving a packet retransmission request from a user terminal;
   determining a packet that needs to be retransmitted;
   detecting a first downlink quality indicator on a gateway side of a first wireless link and a second downlink quality indicator on a gateway side of a second wireless link, wherein a first operating frequency band of the first wireless link is different from a second operating frequency band of the second wireless link;
   determining a link for retransmitting the packet based on the first downlink quality indicator and the second downlink quality indicator; and
   sending the packet to the user terminal on the link by retransmitting a frame I in the packet based on a first preset quantity of retransmissions of the frame I and a frame P in the packet based on a second preset quantity of retransmissions of the frame P,
   wherein the first preset quantity of retransmissions of the frame I is N, the quantity of retransmissions of the frame P is M, N>M, and N and M are non-zero natural numbers.

2. The method of claim 1, further comprising:
   receiving a first uplink quality indicator from the user terminal, wherein the first uplink quality indicator is on a first user terminal side of the first wireless link;
   receiving a second uplink quality indicator from the user terminal, wherein the second uplink quality indicator is on a second user terminal side of the second wireless link; and
   further determining the link based on the first uplink quality indicator and the second uplink quality indicator.

3. The method of claim 1, wherein the first downlink quality indicator comprises a first congestion level of a first downlink on the gateway side of the first wireless link and comprises a first estimated latency of the first downlink, wherein the second downlink quality indicator comprises a second congestion level of a second downlink on the gateway side of the second wireless link and comprises a second estimated latency of the second downlink, and wherein the method further comprises:
   further determining the link as the second wireless link when the first congestion level is greater than or equal to a first threshold;
   further determining the link as the first wireless link when the first congestion level is less than or equal to a second threshold;

further determining the link as the first wireless link when the first congestion level is greater than the second threshold, the first congestion level is less than the first threshold, and the first estimated latency is less than the second estimated latency; and further determining the link as the second wireless link when the first congestion level is greater than the second threshold, the first congestion level is less than the first threshold, and the second estimated latency is less than the first estimated latency.

4. The method of claim 3, wherein the first threshold is 0.9 and the second threshold is 0.1.

5. The method of claim 3, wherein the first congestion level is equal to a percentage of a quantity of to-be-sent packets in a total queue size, wherein the first estimated latency is according to the following equation:

$$\text{Estimated latency} = \frac{\text{Quantity of to-be-sent packets} \times \text{Average packet size}}{\text{Transmission quality}};$$

and wherein the transmission quality is according to the following equation:

Transmission quality=Negotiated rate×(1−Interference duty cycle)×Packet sending success rate.

6. The method of claim 2, wherein each of the first uplink quality indicator and the second uplink quality indicator comprises a congestion level and an estimated latency.

7. The method of claim 1, wherein the first operating frequency band is 5 Gigahertz (GHz) and the second operating frequency band is 2.4 GHz.

8. The method of claim 7, further comprising:
receiving a video stream from a video source server; and
sending the video stream to the user terminal on the first wireless link.

9. The method of claim 1, further comprising retransmitting a second frame in the packet based on a second preset quantity of retransmissions of the second frame and a frame B in the packet based on a third preset quantity of retransmissions of the frame B, wherein the third preset quantity of retransmissions of the frame B is K, M is a quantity of retransmissions of the frame P, M>K, and K is a non-zero natural number.

10. The method of claim 1, wherein the first wireless link and the second wireless link are based on a Wi-Fi protocol.

11. A gateway comprising:
a memory configured to store instructions; and
a processor coupled to the memory and configured to execute the instructions to cause the gateway to:
receive a packet retransmission request from a user terminal;
determine a packet that needs to be retransmitted;
detect a first downlink quality indicator on a first gateway of a first wireless link and a second downlink quality indicator on a gateway side of a second wireless link, wherein a first operating frequency band of the first wireless link is different from a second operating frequency band of the second wireless link;
determine a link for retransmitting a packet based on the first downlink quality indicator and the second downlink quality indicator; and
send the packet to a user terminal on the link by retransmitting a frame I in the packet based on a first preset quantity of retransmissions of the frame I and a frame P in the packet based on a second preset quantity of retransmissions of the frame P,
wherein the first preset quantity of retransmissions of the frame I is N the quantity of retransmissions of the frame P is M, N>M, and N and M are non--zero natural numbers.

12. The gateway of claim 11, wherein the processor is further configured to execute the instructions to cause the gateway to:
receive a first uplink quality indicator from the user terminal, wherein the first uplink quality indicator is on a first user terminal side of the first wireless link;
receive a second uplink quality indicator from the user terminal, wherein the second uplink quality indicator is on a second user terminal side of the second wireless link; and
further determine the link based on the first uplink quality indicator, and the second uplink quality indicator.

13. The gateway of claim 11, wherein the first downlink quality indicator comprises a first congestion level of a first downlink on the gateway side of the first wireless link and comprises a first estimated latency of the first downlink, wherein the second downlink quality indicator comprises a second congestion level of a second downlink on the gateway side of the second wireless link and comprises a second estimated latency, and wherein the processor is further configured to execute the instructions to cause the gateway to:

further determine the link as the second wireless link when the first congestion level is greater than or equal to a first threshold;

further determine the link as the first wireless link when the first congestion level is less than or equal to a second threshold further determine the link as the first wireless link when the first congestion level is greater than the second threshold, the first congestion level is less than the first threshold, and the first estimated latency is less than the second estimated latency; and further determine the link as the second wireless link when the first congestion level is greater than the second threshold, the first congestion level is less than the first threshold, and the second estimated latency is less than the first estimated latency.

14. The gateway of claim 13, wherein the first threshold is 0.9 and the second threshold is 0.1.

15. The gateway of claim 13, wherein the first congestion level is equal to a percentage of a quantity of to-be-sent packets in a total queue size, wherein the first estimated latency is according to the following equation:

$$\text{Estimated latency} = \frac{\text{Quantity of to-be-sent packets} \times \text{Average packet size}}{\text{Transmission quality}};$$

and wherein the transmission quality is according to the following equation:

Transmission quality=Negotiated rate×(1−Interference duty cycle)×Packet sending success rate.

16. The gateway of claim 12, wherein each of the first uplink quality indicator and the second uplink quality indicator comprises a congestion level and an estimated latency.

17. The gateway of claim 11, wherein the processor is further configured to execute the instructions to cause the gateway to:
receive a video stream from a video source server; and
send the video stream to the user terminal on the first wireless link.

18. The gateway of claim 11, wherein the first operating frequency band is 5 Gigahertz (GHz) and the second operating frequency band is 2.4 GHz.

19. The gateway of claim 11, wherein the instructions further cause the processor to be configured to retransmit a second frame in the packet based on a second preset quantity of retransmissions of the second frame and a frame B in the packet based on a third preset quantity of retransmissions of the frame B, wherein the third preset quantity of retransmissions of the frame B is K, M is a quantity of retransmissions of the frame P, M>K, and K is a non-zero natural number.

20. A computer program product comprising computer-executable instructions that are stored on a non-transitory computer-readable medium and that, when executed by a processor, cause a gateway to:
receive a packet retransmission request from a user terminal;
determine a packet that needs to be retransmitted;
detect a first downlink quality indicator on a gateway side of a first wireless link and a second downlink quality indicator on a gateway side of a second wireless link, wherein a first operating frequency band of the first wireless link is different from a second operating frequency band of the second wireless link;
determine a link for retransmitting the packet based on the first downlink quality indicator and the second downlink quality indicator; and
send the packet to the user terminal on the link by retransmitting a frame I in the packet based on a first preset quantity of retransmissions of the frame I and a frame P in the packet based on a second preset quantity of retransmissions of the frame P,
wherein the first preset quantity of retransmissions of the frame I is N, the quantity of retransmissions of the frame P is M, N>M, and N and M are non-zero natural numbers.

21. The computer program product of claim 20, wherein the instructions further cause the gateway to:
receive a first uplink quality indicator from the user terminal, wherein the first uplink quality indicator is on a first user terminal side of the first wireless link;
receive a second uplink quality indicator from the user terminal, wherein the second uplink quality indicator is on a second user terminal side of the second wireless link; and
further determine the link based on the first uplink quality indicator, and the second uplink quality indicator.

22. The computer program product of claim 21, wherein each of the first uplink quality indicator and the second uplink quality indicator comprises a congestion level and an estimated latency.

23. The computer program product of claim 21, wherein the first operating frequency band is 5 Gigahertz (GHz) and the second operating frequency band is 2.4 GHz.

24. The computer program product of claim 23, wherein the instructions further cause the gateway to:
receive a video stream from a video source server; and
send the video stream to the user terminal on the first wireless link.

25. The computer program product of claim 21, wherein the instructions further cause the gateway to retransmit a second frame in the packet based on a second preset quantity of retransmissions of the second frame and a frame B in the packet based on a third preset quantity of retransmissions of the frame B, wherein the third preset quantity of retransmissions of the frame B is K, M is a quantity of retransmissions of the frame P, M>K, and K is a non-zero natural number.

* * * * *